US012374295B2

(12) United States Patent
Kim et al.

(10) Patent No.: US 12,374,295 B2
(45) Date of Patent: Jul. 29, 2025

(54) STAGE CIRCUIT AND DISPLAY DEVICE INCLUDING THE SAME

(71) Applicant: Samsung Display Co., LTD., Yongin-si (KR)

(72) Inventors: Kyung Ho Kim, Yongin-si (KR); Sang Yong No, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/632,112

(22) Filed: Apr. 10, 2024

(65) Prior Publication Data

US 2025/0124878 A1 Apr. 17, 2025

(30) Foreign Application Priority Data

Oct. 11, 2023 (KR) ........................ 10-2023-0135438

(51) Int. Cl.
*G09G 3/3266* (2016.01)
*G09G 3/32* (2016.01)

(52) U.S. Cl.
CPC ............. *G09G 3/3266* (2013.01); *G09G 3/32* (2013.01); *G09G 2300/0861* (2013.01); *G09G 2310/0267* (2013.01); *G09G 2310/08* (2013.01); *G09G 2330/021* (2013.01)

(58) Field of Classification Search
CPC ................... G09G 3/3266; G09G 3/32; G09G 2300/0861; G09G 2310/0267; G09G 2310/08; G09G 2330/021
See application file for complete search history.

(56) References Cited

U.S. PATENT DOCUMENTS

| | | | | |
|---|---|---|---|---|
| 7,633,477 | B2 | 12/2009 | Jang et al. | |
| 10,255,860 | B2 | 4/2019 | Na et al. | |
| 11,475,861 | B2 | 10/2022 | Kim et al. | |
| 2015/0171833 | A1* | 6/2015 | Pi ............................. | H03K 5/05 327/109 |

(Continued)

FOREIGN PATENT DOCUMENTS

| | | | |
|---|---|---|---|
| KR | 10-1183431 B1 | 9/2012 | |
| KR | 10-2020-0120835 A | 10/2020 | |

(Continued)

*Primary Examiner* — Benjamin C Lee
*Assistant Examiner* — Nathan P Brittingham
(74) *Attorney, Agent, or Firm* — Womble Bond Dickinson (US) LLP

(57) ABSTRACT

A stage circuit includes: an output unit connected to a first power input terminal and a second power input terminal, the output unit outputting an enable output signal to a first output terminal and an enable carry signal to a second output terminal; a first driver connected to the first power input terminal, the second power input terminal, a clock input terminal, and a second input terminal; and a second driver connected to a first input terminal, the second input terminal, the first power input terminal, and the clock input terminal, the second driver controlling a voltage of the first node. The second driver includes: a first transistor connected between the first node and the clock input terminal, the first transistor including a gate electrode connected to a control node; and a control transistor and a first capacitor, connected in series between the control node and the clock input terminal.

20 Claims, 10 Drawing Sheets

(56) References Cited

U.S. PATENT DOCUMENTS

2016/0275847 A1* 9/2016 Lin .......................... G06F 1/04
2020/0327861 A1* 10/2020 Kim ....................... G09G 5/003
2022/0309972 A1* 9/2022 Yang .................... G09G 3/3266

FOREIGN PATENT DOCUMENTS

KR 10-2022-0095896 A 7/2022
KR 10-2519822 B1 4/2023

* cited by examiner

STAGE CIRCUIT AND DISPLAY DEVICE INCLUDING THE SAME

CROSS-REFERENCE TO RELATED APPLICATION

The present application claims priority to and the benefit of Korean Patent Application No. 10-2023-0135438, filed on Oct. 11, 2023, in the Korean Intellectual Property Office, the entire disclosure of which is incorporated herein by reference.

BACKGROUND

1. Field

Aspects of some embodiments of the present disclosure generally relates to a stage circuit and a display device including the same.

2. Description of the Related Art

As the information society is developed, consumer demand for display devices for displaying images has increased in various forms. For example, the display devices have been applied to various electronic devices such as smartphones, digital cameras, notebook computers, navigation systems, and smart televisions.

A display device displays images, using pixels. The display device may include a plurality of scan drivers and an emission driver to drive the pixels.

The above information disclosed in this Background section is only for enhancement of understanding of the background and therefore the information discussed in this Background section does not necessarily constitute prior art.

SUMMARY

Aspects of some embodiments include a stage circuit and a display device including the same, which can minimize or reduce power consumption.

According to some embodiments of the present disclosure, there is provided a stage circuit including: an output unit connected to a first power input terminal to which a first power source is input and a second power input terminal to which a second power source is input, the output unit outputting an enable output signal to a first output terminal and outputting an enable carry signal to a second output terminal, corresponding to voltages of a first node and a second node; a first driver connected to the first power input terminal, the second power input terminal, a clock input terminal to which a clock signal is input, and a second input terminal to which a previous enable output signal is input, the first driver controlling the voltages of the first node and the second node; and a second driver connected to a first input terminal to which a previous enable carry signal is input, the second input terminal, the first power input terminal, and the clock input terminal, the second driver controlling a voltage of the first node, wherein the second driver includes: a first transistor connected between the first node and the clock input terminal, the first transistor including a gate electrode connected to a control node; and a control transistor and a first capacitor, connected in series between the control node and the clock input terminal, the control transistor including a gate electrode connected to the first input terminal.

According to some embodiments, the enable output signal may be set to a high level, and the enable carry signal is set to a low level.

According to some embodiments, the control transistor may be connected between the control node and the first capacitor.

According to some embodiments, the control transistor may be set to be in a turn-off state when a disable carry signal as a high level voltage is input to the first input terminal.

According to some embodiments, the control transistor may be connected between the first capacitor and the clock input terminal.

According to some embodiments, the control transistor may be set to be in a turn-off state when a disable carry signal as a high level voltage is input to the first input terminal.

According to some embodiments, the second driver may further include: a second capacitor connected between the first power input terminal and the first node; and a second transistor connected between the first power input terminal and the control node, the second transistor including a gate electrode connected to the second input terminal.

According to some embodiments, the output unit may include: a first output transistor connected between the first power input terminal and the first output terminal, the first output transistor including a gate electrode connected to the first node; a second output transistor connected between the first output terminal and the second power input terminal, the second output transistor including a gate electrode connected to the second node; and a capacitor connected between the first output terminal and the second node. According to some embodiments, the second output terminal may be connected to the first node.

According to some embodiments, the first driver may include: a third transistor connected between the first power input terminal and the first node, the third transistor including a gate electrode connected to a third node; a fourth transistor connected between the third node and the second node, the fourth transistor including a gate electrode connected to the second power input terminal; and a fifth transistor connected between the second input terminal and the third node, the fifth transistor including a gate electrode connected to the clock input terminal.

According to some embodiments, the first power source may be set to a high level voltage, and the second power source may be set to a low level voltage.

According to some embodiments of the present disclosure, a stage circuit includes: an output unit configured to supply an output signal to a first output terminal and supply a carry signal to a second output terminal, corresponding to voltages of a first node and a second node; a first driver configured to control the voltages of the first node and the second node, corresponding to a previous output signal and a clock signal; and a second driver configured to control a voltage of the first node, corresponding to the previous output signal, the clock signal, and a previous carry signal, wherein the second driver includes: a first transistor connected between the first node and a clock input terminal to which the clock signal is input, the first transistor including a gate electrode connected to a control node; and a first capacitor and a control transistor, connected in series between the control node and the clock input terminal, and wherein the control transistor is turned on when the previous carry signal is input, to connect a first electrode of the first capacitor to the clock input terminal and connect a second electrode of the first capacitor to the control node, and is turned off when the previous carry signal is not input, to set the first capacitor to be in a floating state.

According to some embodiments, the control transistor may be connected between the first capacitor and the control node.

According to some embodiments, the control transistor may be connected between the first capacitor and the clock input terminal.

According to some embodiments of the present disclosure, there is provided a display device including a gate driver including a plurality of stage circuits to supply a scan signal having a high level or an emission control signal having the high level, wherein at least one of the stage circuits includes: an output unit connected to a first power input terminal to which a first power source is input and a second power input terminal to which a second power source is input, the output unit outputting an enable output signal to a first output terminal and outputting an enable carry signal to a second output terminal, corresponding to voltages of a first node and a second node; a first driver connected to the first power input terminal, the second power input terminal, a clock input terminal to which a clock signal is input, and a second input terminal to which a previous enable output signal is input, the first driver controlling the voltages of the first node and the second node; and a second driver connected to a first input terminal to which a previous enable carry signal is input, the second input terminal, the first power input terminal, and the clock input terminal, the second driver controlling a voltage of the first node, wherein the second driver includes: a first transistor connected between the first node and the clock input terminal, the first transistor including a gate electrode connected to a control node; and a control transistor and a first capacitor, connected in series between the control node and the clock input terminal, the control transistor including a gate electrode connected to the first input terminal.

According to some embodiments, the enable output signal may be set to the high level, and the enable carry signal may be set to a low level. According to some embodiments, the enable output signal may be the scan signal or the emission control signal.

According to some embodiments, the control transistor may be connected between the control node and the first capacitor, and be set to be in a turn-off state when a disable carry signal as a high level voltage is input to the first input terminal.

According to some embodiments, the control transistor may be connected between the first capacitor and the clock input terminal, and be set to be in a turn-off state when a disable carry signal as a high level voltage is input to the first input terminal.

According to some embodiments, the second driver may further include: a second capacitor connected between the first power input terminal and the first node; and a second transistor connected between the first power input terminal and the control node, the second transistor including a gate electrode connected to the second input terminal.

According to some embodiments, the output unit may include: a first output transistor connected between the first power input terminal and the first output terminal, the first output transistor including a gate electrode connected to the first node; a second output transistor connected between the first output terminal and the second power input terminal, the second output transistor including a gate electrode connected to the second node; and a capacitor connected between the first output terminal and the second node.

According to some embodiments, the second output terminal may be connected to the first node.

According to some embodiments, the first driver may include: a third transistor connected between the first power input terminal and the first node, the third transistor including a gate electrode connected to a third node; a fourth transistor connected between the third node and the second node, the fourth transistor including a gate electrode connected to the second power input terminal; and a fifth transistor connected between the second input terminal and the third node, the fifth transistor including a gate electrode connected to the clock input terminal.

BRIEF DESCRIPTION OF THE DRAWINGS

Aspects of some embodiments of the present disclosure will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
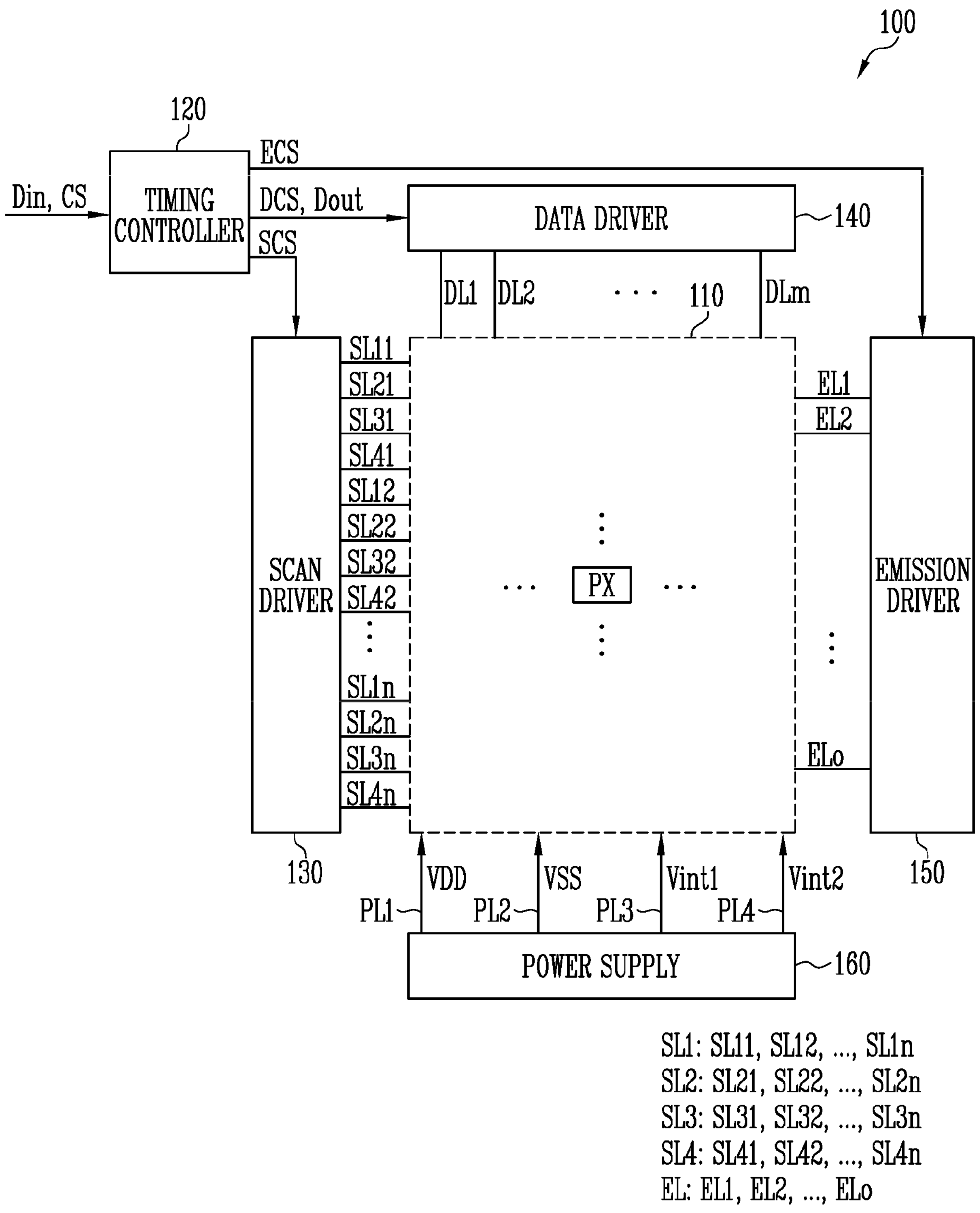
FIG. 1 is a diagram illustrating a display device according to some embodiments of the present disclosure.

Hereinafter, aspects of some embodiments are described in more detail with reference to the accompanying drawings so that those skilled in the art may easily practice the present disclosure. Embodiments according to the present disclosure may be implemented in various different forms and is not limited to the disclosed embodiments described in the present specification.

A part irrelevant to the description will be omitted to clearly describe the present disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present disclosure is not limited thereto. Thicknesses of several portions and regions are exaggerated for clear expressions.

In description, the expression "equal" may mean "substantially equal." That is, this may mean equality to a degree to which those skilled in the art can understand the equality. Other expressions may be expressions in which "substantially" is omitted.

Some embodiments are described in the accompanying drawings in relation to functional blocks, units, and/or modules. Those skilled in the art will understand that these blocks, units, and/or modules are physically implemented by logic circuits, individual components, microprocessors, hard wire circuits, memory elements, line connection, and other electronic circuits. This may be formed by using semiconductor-based manufacturing techniques or other manufacturing techniques. In the case of blocks, units, and/or modules implemented by microprocessors or other similar hardware, the units, and/or modules are programmed and controlled by using software, to perform various functions discussed in the present disclosure, and may be selectively driven by firmware and/or software. In addition, each block, each unit, and/or each module may be implemented by dedicated hardware or by a combination dedicated hardware to perform some functions of the block, the unit, and/or the module and a processor (e.g., one or more programmed microprocessors and associated circuitry) to perform other functions of the block, the unit, and/or the module. In some embodiments, the blocks, the units, and/or the modules may be physically separated into two or more individual blocks, two or more individual units, and/or two or more individual modules without departing from the scope of the present disclosure. Also, in some embodiments, the blocks, the units, and/or the modules may be physically separated into more complex blocks, more complex units, and/or more complex modules without departing from the scope of the present disclosure.

The term "connection" between two components may include both electrical connection and physical connection, but the present disclosure is not necessarily limited thereto. For example, the term "connection" used based on circuit diagrams may mean electrical connection, and the term "connection" used based on sectional and plan views may mean physical connection.

It will be understood that, although the terms "first," "second," etc. may be used herein to describe various elements, these elements should not be limited by these terms. These terms are only used to distinguish one element from another element. Thus, a "first" element discussed below could also be termed a "second" element without departing from the teachings of the present disclosure.

Meanwhile, the present disclosure is not limited to embodiments disclosed below, and may be implemented in various forms. Each embodiment disclosed below may be independently embodied or be combined with at least another embodiment prior to being embodied.

Figure 2:
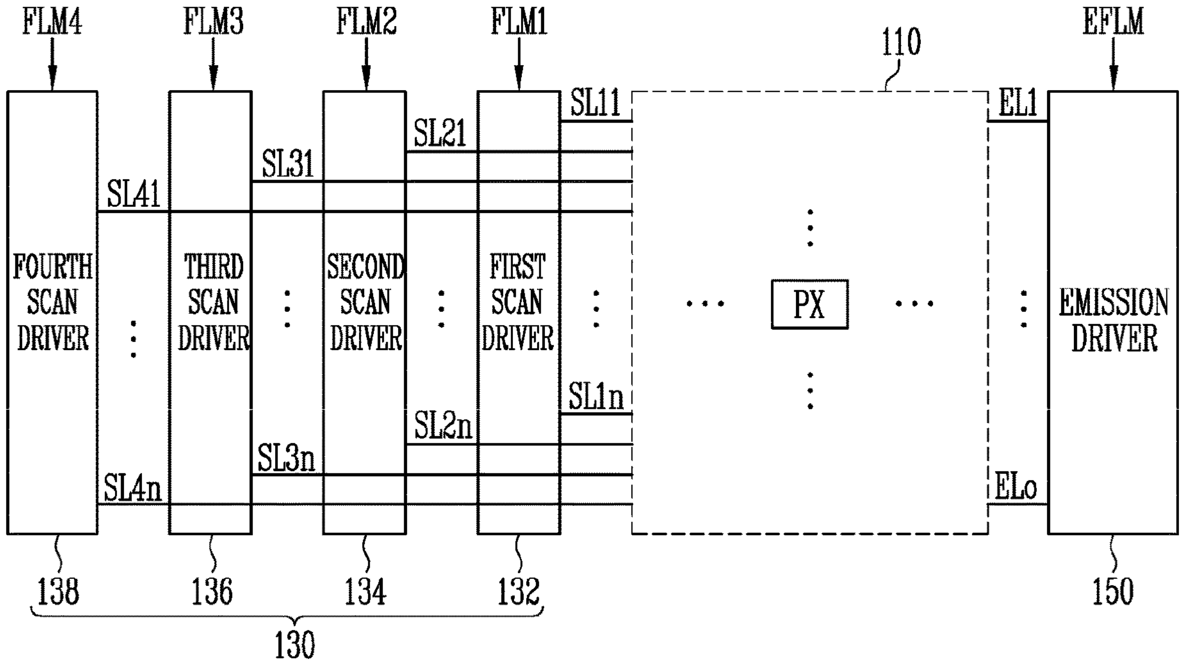
FIG. 2 is a diagram illustrating aspects of a scan driver and an emission driver, which are shown in FIG. 1 according to some embodiments.

FIG. 1 is a diagram illustrating a display device according to some embodiments of the present disclosure. FIG. 2 is a diagram illustrating aspects of a scan driver and an emission driver, which are shown in FIG. 1 according to some embodiments.

Referring to FIG. 1, the display device 100 according to some embodiments of the present disclosure may include a pixel unit 110 (or panel), a timing controller 120, a scan driver 130, a data driver 140, an emission driver 150, and a power supply 160. The above-described components may be implemented as separate integrated circuits, and at least two components among the above-described components may be integrated into one integrated circuit. The scan driver 130 and the emission driver 150 may be formed to be included in the pixel unit 110.

The pixel unit 110 may include pixels PX connected to first scan lines SL11, SL12, . . . , and SL1*n*, second scan lines SL21, SL22, . . . , and SL2*n*, third scan lines SL31, SL32, . . . , and SL3*n*, fourth scan lines SL41, SL42, . . . , and SL4*n*, data lines DL1, DL2, . . . , and DLm, emission control lines EL1, EL2, . . . , and ELo, and power lines PL1, PL2, PL3, and PL4 (n, m, and o are natural numbers).

According to some embodiments, a pixel PXij (see FIG. 3) located on an ith horizontal line (or pixel row) and a jth vertical line (or pixel column) may be connected to an ith first scan line SL1*i*, an ith second scan line SL2*i*, an ith third scan line SL3*i*, an ith fourth scan line SL4*i*, a kth emission control line ELk, and a jth data line DLj (i is an integer of n or less, j is an integer of m or less, and k is an integer of o or less). Here, k is a number which is equal to i or is smaller than i. In an example, when each of the emission control lines EL1 to ELo is connected to pixels PX located on one horizontal line, k may be a number equal to i. According to some embodiments, when each of the emission control lines EL1 to ELo is connected to pixels PX located on at least two horizontal lines, k may be a number smaller than i.

Pixels PX may be selected in units or groups of horizontal lines (e.g., pixels PX connected to the same scan line may be sorted as one horizontal line (or pixel row)) when a first scan signal is supplied to the first scan lines SL11 to SL1*n*. The pixels PX selected by the first scan signal may be supplied with a data signal from a data line (any one of DL1 to DLm) connected thereto. The pixels PX supplied with the data signal may generate light with a luminance (e.g., a set or predetermined luminance), corresponding to a voltage of the data signal.

The scan driver 130 may receive a scan driving signal SCS from the timing controller 120. At least one scan start signal and clock signals, which are necessary for driving of the scan driver 130, may be included in the scan driving signal SCS. The scan driver 130 may generate the first scan signal, a second scan signal, a third scan signal, and a fourth scan signal while shifting the scan start signal, corresponding to the clock signal.

To this end, the scan driver 130 may include a first scan driver 132, a second scan driver 134, a third scan driver 136, and a fourth scan driver 138 as shown in FIG. 2.

The first scan driver 132 may receive a first scan start signal FLM1, and generate the first scan signal while shifting the first scan start signal FLM1, corresponding to the clock signal. The first scan driver 132 may sequentially supply the first scan signal to the first scan lines SL11 to SL1*n*.

The second scan driver 134 may receive a second scan start signal FLM2, and generate the second scan signal while shifting the second scan start signal FLM2, corresponding to the clock signal. The second scan driver 134 may sequentially supply the second scan signal to the second scan lines SL21 to SL2*n*.

The third scan driver 136 may receive a third scan start signal FLM3, and generate the third scan signal while shifting the third scan start signal FLM3, corresponding to the clock signal. The third scan driver 136 may sequentially supply the third scan signal to the third scan lines SL31 to SL3*n*.

The fourth scan driver 138 may receive a fourth scan start signal FLM4, and generate the fourth scan signal while shifting the fourth scan start signal FLM4, corresponding to the clock signal. The fourth scan driver 138 may sequentially supply the fourth scan signal to the fourth scan lines SL41 to SL4*n*.

In FIG. 2, it is illustrated that each of the scan drivers 132, 134, 136, and 138 receives one scan start signal (any one of FLM1, FLM2, FLM3, and FLM4). However, embodiments according to the present disclosure are not limited thereto. In an example, at least one of the scan drivers 132, 134, 136, or 138 may receive two or more scan start signals.

The first scan signal, the second scan signal, the third scan signal, and the fourth scan signal may be set to a gate-on voltage such that transistors included in the pixels PX can be turned on. In an example, a scan signal having a low level may be supplied to a P-type transistor, and a scan signal having a high level may be supplied to an N-type transistor. A transistor supplied with the first scan signal, the second scan signal, the third scan signal, or the fourth scan signal may be turned on corresponding to the first scan signal, the second scan signal, the third scan signal, or the fourth scan signal.

After that, that the first scan signal, the second scan signal, the third scan signal, or the fourth scan signal are supplied may mean that the gate-on voltage is supplied to a first scan line SL1, a second scan line SL2, a third scan line SL3, or a fourth scan line SL4. Also, that the first scan signal, the second scan signal, the third scan signal, or the fourth scan signal are not supplied may mean that a gate-off voltage is supplied to the first scan line SL1, the second scan line SL2, the third scan line SL3, or the fourth scan line SL4.

In FIG. 2, it is illustrated that the first scan driver 132, the second scan driver 134, the third scan driver 136, and the fourth scan driver 138 are respectively connected to the first scan line SL1, the second scan line SL2, the third scan line SL3, and the fourth scan line SL4. However, the embodiments of the present disclosure are not limited thereto. In an example, at least two scan lines (at least two of SL1, SL2, SL3, and SL4) among the first scan line SL1, the second scan line SL2, the third scan line SL3, and the fourth scan line SL4 may be driven by one scan driver.

The data driver 140 may receive output data Dout and a data driving signal DCS from the timing controller 120. The data driving signal DCS may include a sampling signal and/or timing signals, necessary for driving of the data driver 140. The data driver 140 may generate a data signal, based on the data driving signal DCS and the output data Dout. In an example, the data driver 140 may generate an analog data signal, based on a grayscale of the output data Dout. The data driver 140 may supply the data signal to the data lines DL1 to DLm to be synchronized with the first scan signal.

The emission driver 150 may receive an emission driving signal ECS from the timing controller 120. An emission start signal and clock signals, which are necessary for driving the emission driver 150, may be included in the emission driving signal ECS. The emission driver 150 may generate an emission control signal while shifting the emission start signal, corresponding to the clock signal.

In an example, the emission driver 150 may receive an emission start signal EFLM as shown in FIG. 2, and generate an emission control signal while shifting the emission start signal EFLM, corresponding to the clock signal. The emission driver 150 may sequentially supply the emission control signal to the emission control lines EL1 to ELo.

In FIG. 2, it is illustrated that the emission driver 150 receives one emission start signal EFLM. However, the embodiments of the present disclosure are not limited thereto. According to some embodiments, the emission driver 150 may receive two or more emission start signals.

The emission control signal may be set to the gate-off voltage such that the transistors included in the pixels PX can be turned off. In an example, an emission control signal signal having the high level may be supplied to the P-type transistor, and an emission control signal having the low level may be supplied to the N-type transistor. A transistor supplied with the emission control signal may be turned off corresponding to the emission control signal. After that, that the emission control signal is supplied may mean that the gate-off voltage is supplied to an emission control line EL. Also, that the emission control signal is not supplied may mean that the gate-on voltage is supplied to the emission control line EL.

The timing controller 120 may receive input data Din and a control signal CS from a host system through an interface. In an example, the timing controller 120 may receive the input data Din and the control signal CS from at least one of a Graphics Processing Unit (GPU), a Central Processing Unit (CPU), or an Application Processor (AP), which are included in the host system. Various signals including a clock signal may be included in the control signal CS.

The timing controller 120 may generate the scan driving signal SCS, the data driving signal DCS, and the emission driving signal ECS, based on the control signal CS. The scan driving signal SCS, the data driving signal DCS, and the emission driving signal ECS may be supplied to the scan driver 130, the data driver 140, and the emission driver 150, respectively.

The timing controller 120 may realign the input data Din to be suitable for specifications of the display device 100. Also, the timing controller 120 may generate the output data Dout by correcting the input data Din, and supply the output data Dout to the data driver 140. According to some embodiments, the timing controller 120 may correct the input data Din, corresponding to an optical measurement result measured in a processing process.

The power supply 160 may generate various power sources necessary for driving of the display device 100. In an example, the power supply 160 may generate a first driving power source VDD, a second driving power source VSS, a first initialization power source Vint1, and a second initialization power source Vint2.

The first driving power source VDD may be a power source which supplies a driving current to the pixels PX. The second driving power source VSS may be a power source which is supplied with the driving current from the pixels PX. The first driving power source VDD may be set to a voltage higher than a voltage of the second driving power source VSS during a period in which the pixels PX is set to be in an emission state.

The first initialization power source Vint1 may be a voltage for initializing a gate electrode a driving transistor (a first transistor M21 shown in FIG. 3) included in each of the pixels PX. The first initialization power source Vint1 may be set to a voltage value lower than a voltage value of the data signal. The second initialization power source Vint2 may be a voltage for initializing a first electrode (or anode electrode) of a light emitting element LD (see FIG. 3) included in each of the pixels PX. The second initialization power source Vint2 may have a voltage value at which the light emitting element LD is turned off when the voltage of the second initialization power source Vint2 is supplied to the first electrode of the light emitting element LD.

The first driving power source VDD generated by the power supply 160 may be supplied to a first power line PL1, the second driving power source VSS generated by the power supply 160 may be supplied to a second power line PL2, the first initialization power source Vint1 generated by the power supply 160 may be supplied to a third power line PL3, and the second initialization power source Vint2 generated by the power supply 160 may be supplied to a fourth power line PL4. The first power line PL1, the second power line PL2, the third power line PL3, and the fourth power line PL4 may be commonly connected to the pixels PX, but the embodiments of the present disclosure are not limited thereto.

According to some embodiments, the first power line PL1 may be configured with a plurality of power lines, and the plurality of power lines may be connected to different pixels PX. According to some embodiments, the second power line PL2 may be configured with a plurality of power lines, and the plurality of power lines may be connected to different pixels PX. According to some embodiments, the third power line PL3 may be configured with a plurality of power lines, and the plurality of power lines may be connected to different pixels PX. According to some embodiments, the fourth power line PL4 may be configured with a plurality of power lines, and the plurality of power lines may be connected to different pixels PX. That is, according to some embodiments of the present disclosure, the pixels PX may be connected to any one of the plurality of power lines of the first power line PL1, any one of the plurality of power lines of the second power line PL2, any one of the plurality of power lines of the third power line PL3, and any one of the plurality of power lines of the fourth power line PL4.

Figure 3:
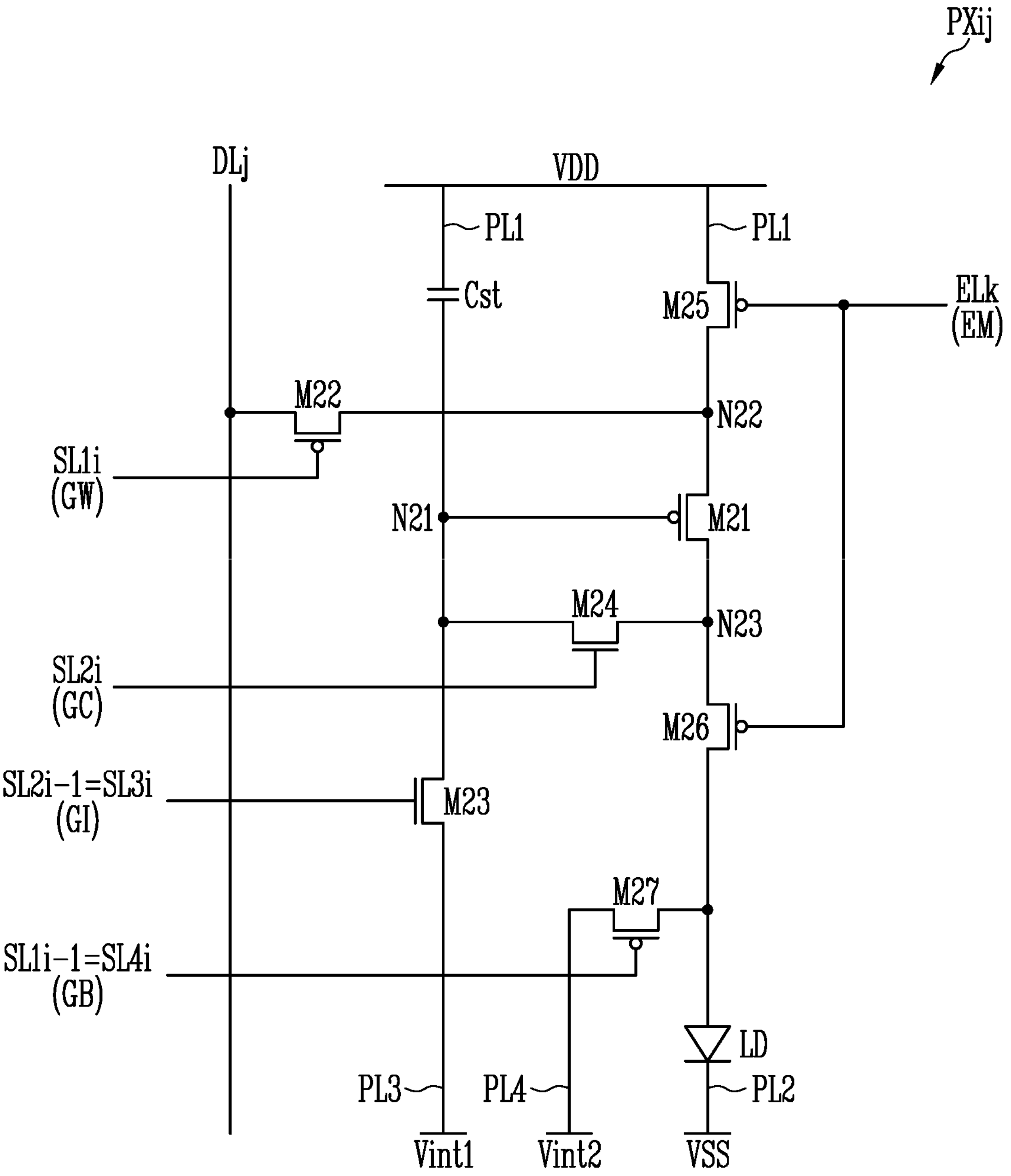
FIG. 3 is a diagram illustrating aspects of a pixel shown in FIG. 1 according to some embodiments.

FIG. 3 is a diagram illustrating aspects of the pixel shown in FIG. 1 according to some embodiments. In FIG. 3, a pixel located on an ith horizontal line and a jth vertical line will be illustrated.

Referring to FIG. 3, a pixel PXij according to some embodiments of the present disclosure may be connected to corresponding signal lines SL1*i*, SL2*i*, SL3*i*, SL4*i*, ELk, and DLj. For example, the pixel PXij may be connected to an ith first scan line SL1*i*, an ith second scan line SL2*i*, an ith third scan line SL3*i*, an ith fourth scan line SL4*i*, a kth emission control line ELk, and a jth data line DLj. According to some embodiments, the pixel PXij may be further connected to the first power line PL1, the second power line PL2, the third power line PL3, and the fourth power line PL4.

The ith third scan line SL3*i* may be an (i−1)th second scan line SL2*i*-1. The ith fourth scan line SL4*i* may be an (i−1)th first scan line SL1*i*-1. Signals actually necessary for driving of the pixel PXij may be set as a first scan signal GW, a second scan signal GC, and an emission control signal EM. That is, the ith third scan line SL3*i* may be driven by a second scan signal of a previous pixel row, and the ith fourth scan line SL4*i* may be driven by a first scan signal of the previous pixel row.

The pixel PXij according to some embodiments of the present disclosure may include a light emitting element LD and a pixel circuit for controlling an amount of current supplied to the light emitting element LD.

The light emitting element LD may be connected between the first power line PL1 and the second power line PL2. In an example, a first electrode (or anode electrode) of the light emitting element LD may be electrically connected to the first power line PL1 via a sixth transistor M26, a third node N23, a first transistor M21, a second node N22, and a fifth transistor M25, and a second electrode (or cathode electrode) of the light emitting element LD may be electrically connected to the second power line PL2. The light emitting element LD may generate light with a luminance (e.g., set or predetermined luminance), corresponding to an amount of current supplied from the first power line PL1 to the second power line PL2 via the pixel circuit.

The light emitting element LD may be selected as an organic light emitting diode. Also, the light emitting element LD may be selected as an inorganic light emitting diode such as a micro LED (light emitting diode) or a quantum dot light emitting diode. Also, the light emitting element LD may be an element configured with a combination of an organic material and an inorganic material. In FIG. 3, it is illustrated that the pixel PXij includes a single light emitting element LD. However, according to some embodiments, the pixel PXij may include a plurality of light emitting elements LD, and the plurality of light emitting elements LD may be connected in series, parallel or series/parallel to each other.

The pixel circuit may include the first transistor M21, a second transistor M22, a third transistor M23, a fourth transistor M24, the fifth transistor M25, the sixth transistor M26, a seventh transistor M27, and a storage capacitor Cst.

A first electrode of the first transistor M21 (or driving transistor) may be connected to the second node N22, and a second electrode of the first transistor M21 may be connected to the third node N23. In addition, a gate electrode of the first transistor M21 may be connected to a first node N21. The first transistor M21 may control an amount of current supplied from the first driving power source VDD to the second driving power source VSS via the light emitting element LD, corresponding to a voltage of the first node N21.

The second transistor M22 may be connected between the data line DLj and the second node N22. In addition, a gate electrode of the second transistor M22 may be electrically connected to the first scan line SL1*i*. The second transistor M22 may be turned on when the first scan signal GW is supplied to the first scan line SL1*i*, to electrically connect the data line DLj and the second node N22 to each other.

A first electrode of the third transistor M23 may be connected to the first node N21, and a second electrode of the third transistor M23 may be electrically connected to the third power line PL3. In addition, a gate electrode of the third transistor M23 may be electrically connected to the third scan line SL3*i*. The third transistor M23 may be turned on when a third scan signal GI is supplied to the third scan line SL3*i*, to supply the voltage of the first initialization power source Vint1 to the first node N21. The first initialization power source Vint1 may be set to a voltage lower than a data signal supplied to the data line DLj.

The fourth transistor M24 may be connected between the first node N21 and the third node N23. In addition, a gate electrode of the fourth transistor M24 may be electrically connected to the second scan line SL2*i*. The fourth transistor M24 may be turned on when the second scan signal GC is supplied to the second scan line SL2*i*, to electrically connect the first node N21 and the third node N23 to each other. That is, when the fourth transistor M24 is turned on, the first transistor M21 may be diode-connected.

A first electrode of the fifth transistor M25 may be electrically connected to the first power line PL1, and a second electrode of the fifth transistor M25 may be connected to the second node N22. In addition, a gate electrode of the fifth transistor M25 may be electrically connected to the emission control line ELk. The fifth transistor M25 may be turned off when the emission control signal EM is supplied to the emission control line ELk, and be turned on when the emission control signal EM is not supplied.

The sixth transistor M26 may be connected between the third node N23 and the first electrode of the light emitting element LD. In addition, a gate electrode of the sixth transistor M26 may be electrically connected to the emission control line ELk. The sixth transistor M26 may be turned off when the emission control signal EM is supplied to the emission control line ELk, and be turned on when the emission control signal EM is not supplied.

A first electrode of the seventh transistor M27 may be connected to the first electrode of the light emitting element LD, and a second electrode of the seventh transistor M27 may be electrically connected to the fourth power line PL4. In addition, a gate electrode of the seventh transistor M27 may be electrically connected to the fourth scan line SL4*i*. The seventh transistor M27 may be turned on when a fourth scan signal GB is supplied to the fourth scan line SL4*i*, to supply the voltage of the second initialization power source Vint2 to the first electrode of the light emitting element LD.

When the voltage of the second initialization power source Vint2 is supplied to the first electrode of the light emitting element LD, a parasitic capacitor of the light emitting element LD may be discharged. As a residual voltage charged in the parasitic capacitor of the light emitting element LD is discharged (or removed), unintended minute emission can be prevented. Thus, the black expression ability of the pixel PXij can be improved.

The storage capacitor Cst may be connected between the first power line PL1 and the first node N21. The storage capacitor Cst may store a voltage applied to the first node N21.

According to some embodiments, the first transistor M21, the second transistor M22, the fifth transistor M25, the sixth transistor M26, and the seventh transistor M27 may be implemented with a poly-silicon semiconductor transistor. For example, the first transistor M21, the second transistor M22, the fifth transistor M25, the sixth transistor M26, and the seventh transistor M27 may include a poly-silicon semiconductor layer formed as an active layer (channel) through a low temperature poly-silicon (LTPS) process. In addition, the first transistor M21, the second transistor M22, the fifth transistor M25, the sixth transistor M26, and the seventh transistor M27 may be implemented with a P-type transistor (e.g., a PMOS transistor). Accordingly, a gate-on voltage at which the first transistor M21, the second transistor M22, the fifth transistor M25, the sixth transistor M26, and the seventh transistor M27 are turned on may have a low level. Because the poly-silicon semiconductor transistor has an advantage of high response speed, the poly-silicon semiconductor transistor may be applied to a switching element which requires fast switching.

According to some embodiments, the third transistor M23 and the fourth transistor M24 may be formed with an oxide semiconductor transistor. For example, the third transistor M23 and the fourth transistor M24 may be implemented with an N-type oxide semiconductor transistor (e.g., an NMOS transistor), and include an oxide semiconductor layer as an active layer. Accordingly, a gate-on voltage at which the third transistor M23 and the fourth transistor M24 are turned on may have a high level.

The oxide semiconductor transistor can be formed through a low temperature process, and have a charge mobility lower than a charge mobility of the poly-silicon semiconductor transistor. That is, the oxide semiconductor transistor has an excellent off-current characteristic. Thus, when the third transistor M23 and the fourth transistor M24 are implemented with the oxide semiconductor transistor, leakage current according to low frequency driving can be minimized or reduced, and accordingly, display quality can be relatively improved.

Figure 4:
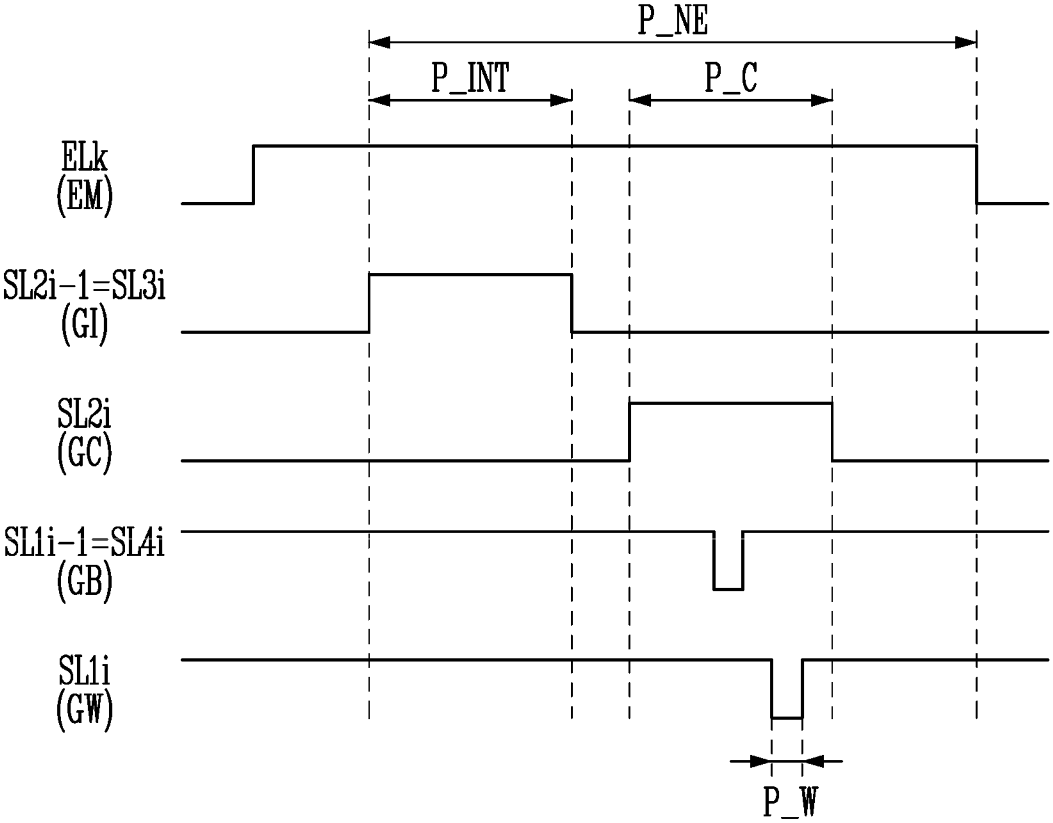
FIG. 4 is a waveform diagram illustrating aspects of a driving method of the pixel shown in FIG. 3 according to some embodiments.

FIG. 4 is a waveform diagram illustrating aspects of a driving method of the pixel shown in FIG. 3 according to some embodiments.

Referring to FIG. 4, one frame period may include a non-emission period P_NE, and the non-emission period P_NE may include an initialization period P_INT, a compensation period P_C, and a writing period P_W. The writing period P_W may be included in the compensation period P_C.

The emission control signal EM may have a high level in the non-emission period P_NE. The fifth transistor M25 and the sixth transistor M26 may be turned off in response to the emission control signal EM having the high level, and the pixel PXij may not emit light.

The third scan signal GI may have the high level in the initialization period P_INT. The third transistor M23 may be turned on in response to the third scan signal GI having the high level, and the voltage of the first initialization power source Vint1 of the third power line PL3 may be provided to the first node N21.

After that, the second scan signal GC may have the high level during the compensation period P_C. The fourth transistor M24 may be turned on in response to the second scan signal GC having the high level, and the first transistor M21 may be diode-connected.

The first scan signal GW may have a low level in the writing period P_W.

The second transistor M22 may be turned on in response to the first scan signal GW having the low level, and a data signal may be provided to the second node N22 from the jth data line DLj. In addition, because the fourth transistor M24 is in a turn-on state in response to the second scan signal GC having the high level, the data signal may be transferred from the second node N22 to the first node N21 via the first transistor M21 and the fourth transistor M24. Because a form in which the first transistor M21 is diode-connected is maintained by the turned-on fourth transistor M24, the first node N21 may have the data signal obtained by compensating for a threshold voltage of the first transistor M21.

Before the writing period P_W, the fourth scan signal GB may have the low level. The seventh transistor M27 may be turned on in response to the fourth scan signal GB having the low level, and the voltage of the second initialization power source Vint2 may be supplied to the first electrode of the light emitting element LD.

After that, the non-emission period P_NE may be ended, and the emission control signal EM may have the low level. The fifth transistor M25 and the sixth transistor M26 may be turned on in response to the emission control signal EM having the low level. When the fifth transistor M25 and the sixth transistor M26 are turned on, a current flowing path is formed from the first power line PL1 to the second power line PL2 via the fifth transistor M25, the first transistor M21, the sixth transistor M26, and the light emitting element LD. A driving current corresponding to the voltage of the first node N21 may flow through the light emitting element LD according to an operation of the first transistor M21, and the light emitting element LD may emit light with a luminance corresponding to the driving current.

Figure 5:
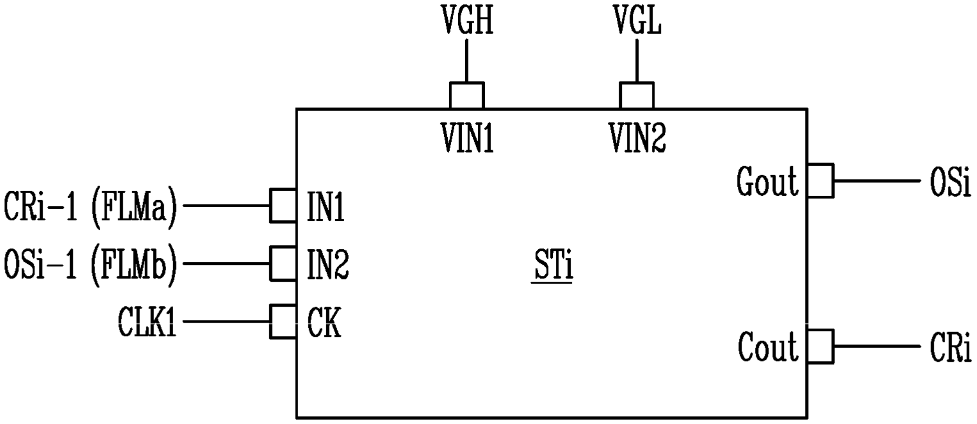
FIG. 5 is a diagram illustrating a stage circuit according to some embodiments of the present disclosure.

FIG. 5 is a diagram illustrating a stage circuit according to some embodiments of the present disclosure. The stage circuit according to some embodiments of the present disclosure may be included in the second scan driver 134 and/or the third scan driver 136, which supply/supplies a scan signal having a high level. The stage circuit according to some embodiments of the present disclosure may be included in the emission driver 150 which supplies an emission control signal having the high level. In FIG. 5, a stage circuit located on an ith horizontal line will be described.

Referring to FIG. 5, the stage circuit STi according to some embodiments of the present disclosure may include a first input terminal IN1, a second input terminal IN2, a first power input terminal VIN1, a second power input terminal VIN2, a clock input terminal CK, a first output terminal Gout, and a second output terminal Cout.

The first input terminal IN1 may receive an enable carry signal CRi-1 (or a first start signal FLMa (see FIG. 8)) input from a previous stage circuit. The enable carry signal CRi-1 or the first start signal FLMa of the previous stage circuit may be set to a gate-on voltage, e.g., a low level voltage such that transistors included in the stage circuit can be turned on.

The second input terminal IN2 may receive an enable output signal OSi-1 (or a second start signal FLMb (see FIG. 8) input from the previous stage circuit. The enable output signal OSi-1 or the second start signal FLMb of the previous stage circuit may be set to a gate-off voltage, e.g., a high level voltage such that the transistors included in the stage circuit can be turned off.

The clock input terminal CK may receive a first clock signal CLK1 (or a second clock signal CLK2 (see FIG. 8)). In an example, a clock input terminal CK included in an odd-numbered (or even-numbered) stage circuit may receive the first clock signal CLK1, and a clock input terminal CK included in an even-numbered (or odd-numbered) stage circuit may receive the second clock signal CLK2. That is, the first clock signal CLK1 and the second clock signal CLK2 may be alternately input to stage circuit for every horizontal line. The first clock signal CLK1 and the second clock signal CLK2 may be signals which have the same cycle and have phases reversed from each other.

The first power input terminal VIN1 may receive a first power source VGH. The first power source VGH may be set to the gate-off voltage, e.g., the high level voltage such that the transistors included in the stage circuit can be turned off. The second power input terminal VIN2 may receive a second power source VGL. The second power source VGL may be set to the gate-on voltage, e.g., the low level voltage such that the transistors included in the stage circuit can be turned on.

The first output terminal Gout may output an enable output signal OSi. The enable output signal OSi may be set to the high level voltage, and be supplied as the second scan signal GC, the third scan signal GI or the emission control signal EM to the pixels PX. The second output terminal Cout may output an enable carry signal CRi. The enable carry signal CRi may be set to the low level voltage, and be supplied to a next stage circuit.

Figure 6:
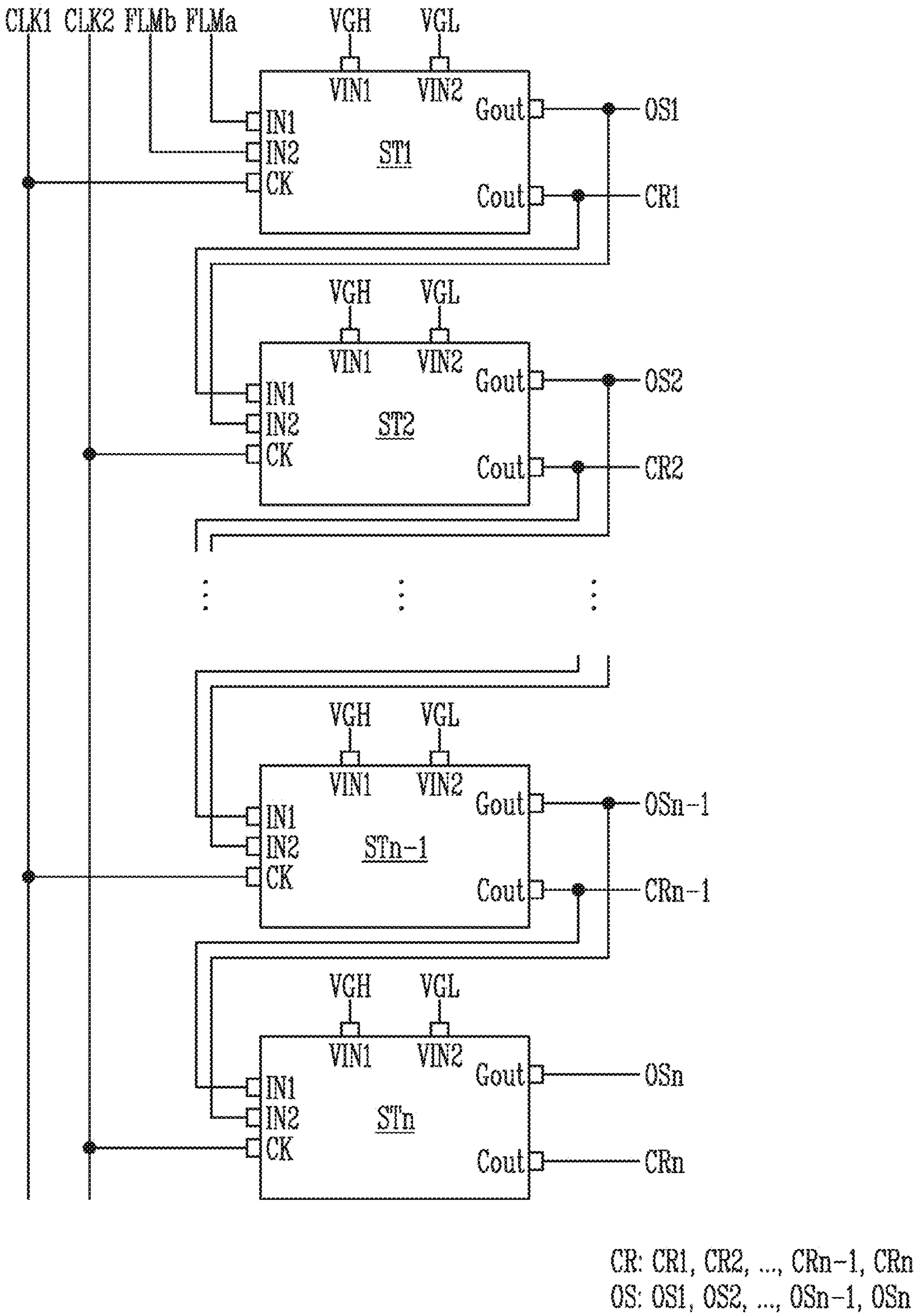
FIG. 6 is a diagram illustrating a gate driver according to some embodiments of the present disclosure.

FIG. 6 is a diagram illustrating a gate driver according to some embodiments of the present disclosure. The gate driver shown in FIG. 6 may be at least one of the second scan driver 134, the third scan driver 136, or the emission driver 150.

Referring to FIG. 6, the gate driver according to some embodiments of the present disclosure may include stage circuits ST1, ST2, . . . , STn−1, and STn located for every horizontal line.

A first stage circuit ST1 may receive the first start signal FLMa input through a first input terminal IN1, and receive the second start signal FLMb input through a second input terminal IN2.

Each of the other stage circuits ST2 to STn except the first stage circuit ST1 may be supplied with an enable carry signal CR of a previous stage circuit through a first input terminal IN1, and be supplied with an enable output signal OS of the previous stage circuit through a second input terminal IN2.

The first clock signal CLK1 may be supplied to a clock input terminal CK of each of odd-numbered stage circuits ST1, . . . , and STn−1, and the second clock signal CLK2 may be supplied to a clock input terminal CK of each of even-numbered stage circuits ST2, . . . , and STn.

The stage circuits ST1 to STn may be driven as shift registers, and sequentially output enable output signals OS1 to OSn and enable carry signals CR1 to CRn while shifting the first start signal FLMa and the second start signal FLMb, corresponding to the clock signals CLK1 and CLK2.

Figure 7:
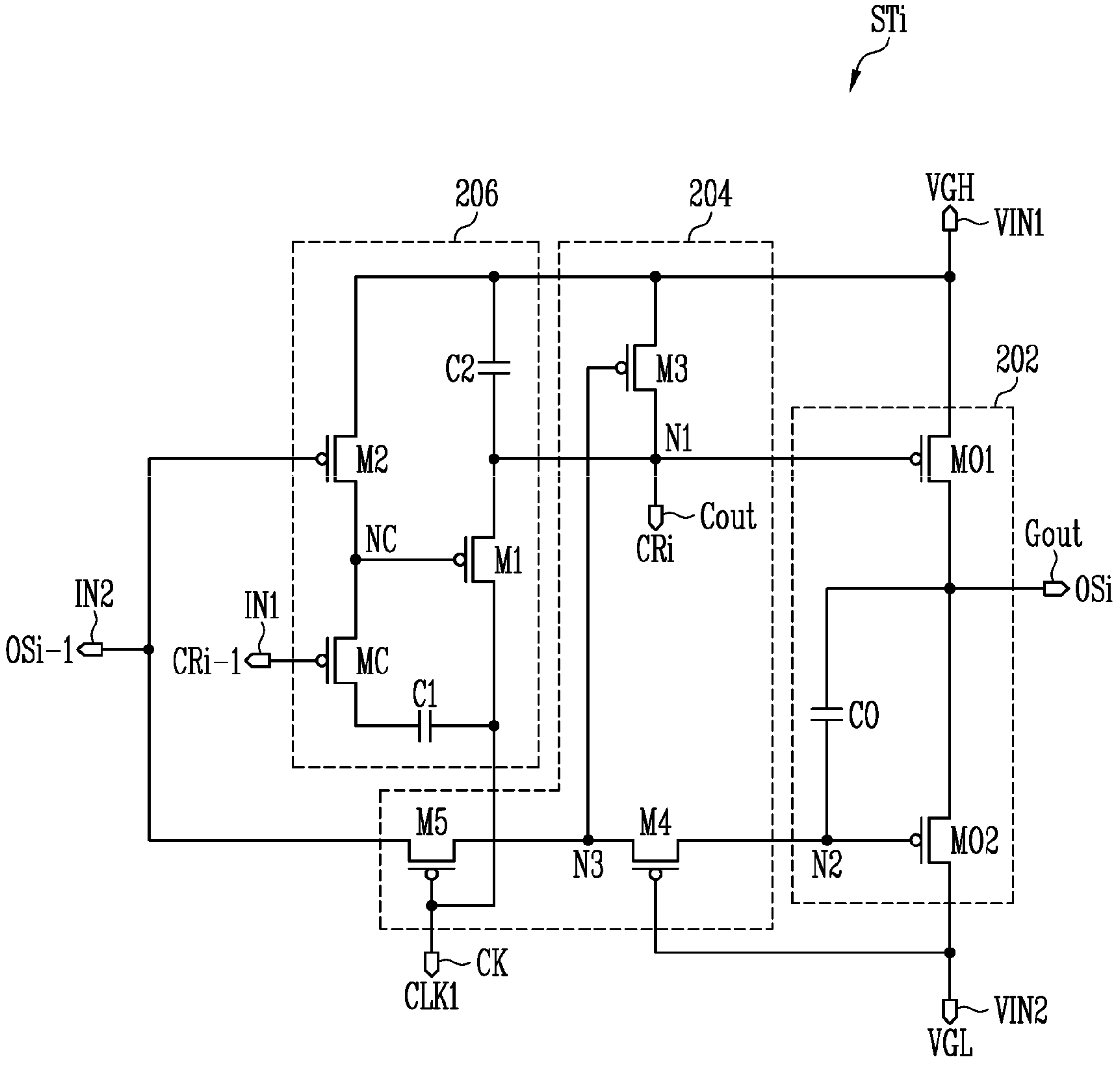
FIG. 7 is a diagram illustrating a stage circuit according to some embodiments of the present disclosure.

FIG. 7 is a diagram illustrating a stage circuit according to some embodiments of the present disclosure. In FIG. 7, an ith stage circuit STi will be illustrated. The stage circuits ST1 to STn may be implemented as circuits substantially identical to the ith stage circuit STi.

Referring to FIG. 7, the stage circuit STi may include an output unit (or output circuit or output component) 202, a first driver 204, and a second driver 206.

The output unit 202 may receive the first power source VGH input from a first power input terminal VIN1, and receive the second power source VGL input from a second power input terminal VIN2. The output unit 202 may output an enable output signal OSi to a first output terminal Gout and output an enable carry signal CRi to a second output terminal Cout, corresponding to voltages of a first node N1 and a second node N2.

To this end, the output unit 202 may include a first output transistor MO1, a second output transistor M02, and a capacitor CO.

The first output transistor MO1 may be connected between the first power input terminal VIN1 and the first output terminal Gout. In addition, a gate electrode of the first output transistor MO1 may be connected to the first node N1. The first output transistor MO1 may control electrical connection between the first power input terminal VIN1 and the first output terminal Gout while being turned on or turned off corresponding to a voltage of the first node N1. When the first power input terminal VIN1 and the first output terminal Gout are electrically connected to each other, a voltage of the first power source VGH may be output to the first output terminal Gout. The voltage of the first power source VGH, which is supplied to the first output terminal Gout, may be supplied as an enable output signal OSi (or supply of an output signal OSi) to a scan line and/or an emission control line.

The second output transistor M02 may be connected between the second power input terminal VIN2 and the first output terminal Gout. In addition, a gate electrode of the second output transistor M02 may be connected to the second node N2. The second output transistor M02 may control electrical connection between the second power input terminal VIN2 and the first output terminal Gout while being turned on or turned off corresponding to a voltage of the second node N2. When the second power input terminal VIN2 and the first output terminal Gout are electrically connected to each other, a voltage of the second power source VGL may be output to the first output terminal Gout.

The voltage of the second power source VGL, which is supplied to the first output terminal Gout, may be supplied as a disable output signal OSi (or supply suspension of the output signal OSi) to the scan line and/or the emission control line.

The capacitor CO may be connected between the first output terminal Gout and the second node N2. The capacitor CO may store a voltage between the first output terminal Gout and the second node N2.

The second output terminal Cout may be connected to the first node N1. The second output terminal Cout may supply the voltage of the first node N1 as the carry signal CRi to a next stage circuit. When the first node N1 has a low level voltage, an enable carry signal CRi (or supply of the carry signal CRi) may be supplied. When the first node N1 has a high level voltage, a disable carry signal CRi (or supply suspension of the carry signal CRi) may be supplied.

The first driver 204 may control the voltages of the first node N1 and the second node N2, corresponding to the first power source VGH supplied from the first power input terminal VIN1, the second power source VGL supplied from the second power input terminal VIN2, a previous output signal OSi-1 supplied to a second input terminal IN2, and the first clock signal CLK1 supplied to a clock input terminal CK.

To this end, the first driver 204 may include a third transistor M3, a fourth transistor M4, and a fifth transistor M5.

The third transistor M3 may be connected between the first power input terminal VIN1 and the first node N1. In addition, a gate electrode of the third transistor M3 may be connected to a third node N3. The third transistor M3 may control electrical connection between the first node N1 and the first power input terminal VIN1 while being turned on or turned off corresponding to a voltage of the third node N3.

The fourth transistor M4 may be connected between the second node N2 and the third node N3. In addition, a gate electrode of the fourth transistor M4 may be connected to the second power input terminal VIN2. The turn-on state of the fourth transistor M4 may be maintained by the second power source VGL supplied from the second power input terminal VIN2. The second node N2 and the third node N3 may maintain an electrical connection state.

The fourth transistor M4 may prevent the voltage of the third node N3 from being decreased to the second power source VGL or lower, corresponding to a change in the voltage of the second node N2. Similarly, the fourth transistor M4 may prevent the voltage of the second node N2 from being decreased to the second power source VGL or lower, corresponding to a change in the voltage of the third node N3.

The fifth transistor M5 may be connected between the second input terminal IN2 and the third node N3. In addition, a gate electrode of the fifth transistor M5 may be connected to the clock input terminal CK. The fifth transistor M5 may control electrical connection between the second input terminal IN2 and the third node N3 while being turned on or turned off corresponding to the first clock signal CLK1 supplied to the clock input terminal CK.

In an example, the fifth transistor M5 may be turned on when the first clock signal CLK1 having a low level is supplied, to electrically connect the second input terminal IN2 and the third node N3 to each other. In an example, the fifth transistor M5 may be turned off when the first clock signal CLK having a high level is supplied, to electrically block the second input terminal IN2 and the third node N3 from each other.

The second driver 206 may control the voltage of the first node N1, corresponding to the first power source VGH supplied from the first input terminal VIN1, a previous carry signal CRi-1 supplied to a first input terminal IN1, the previous output signal OSi-1 supplied to the second input terminal IN2, and the first clock signal CLK1 supplied to the clock input terminal CK.

To this end, the second driver 206 may include a first transistor M1, a second transistor M2, a control transistor MC, a first capacitor C1, and a second capacitor C2.

The first transistor M1 may be connected between the first node N1 and the clock input terminal CK. In addition, a gate electrode of the first transistor M1 may be connected to a control node NC. The first transistor M1 may control electrical connection between the clock input terminal CK and the first node N1 while being turned on or turned off corresponding to a voltage of the control node NC.

The second transistor M2 may be connected between the control node NC and the first power input terminal VIN1. In addition, a gate electrode of the second transistor M2 may be connected to the second input terminal IN2. The second transistor M2 may be turned off when a previous enable output signal OSi-1 is supplied to the second input terminal IN2, and be turned on when a previous disable output signal OSi-1 is supplied to the second input terminal IN2.

The control transistor MC and the first capacitor C1 may be connected in series between the control node NC and the clock input terminal CK.

The control transistor MC may be connected between the control node NC and a second electrode of the first capacitor C1. In addition, a gate electrode of the control transistor MC may be connected to the first input terminal IN1. The control transistor MC may be turned on when a previous enable carry signal CRi-1 is supplied to the first input terminal IN1, and be turned off when a previous disable carry signal CRi-1 is supplied to the first input terminal IN1.

A first electrode of the first capacitor C1 may be connected to the clock input terminal CK, and the second electrode of the first capacitor C1 may be connected to the control transistor MC. The first capacitor C1 may transfer a voltage of the first clock signal CLK1, which is input the clock input terminal CK, to the control node NC while being driven as a coupling capacitor.

The second capacitor C2 may be connected between the first power input terminal VIN1 and the first node N1. The second capacitor C2 may store the voltage of the first node N1.

Figure 8:
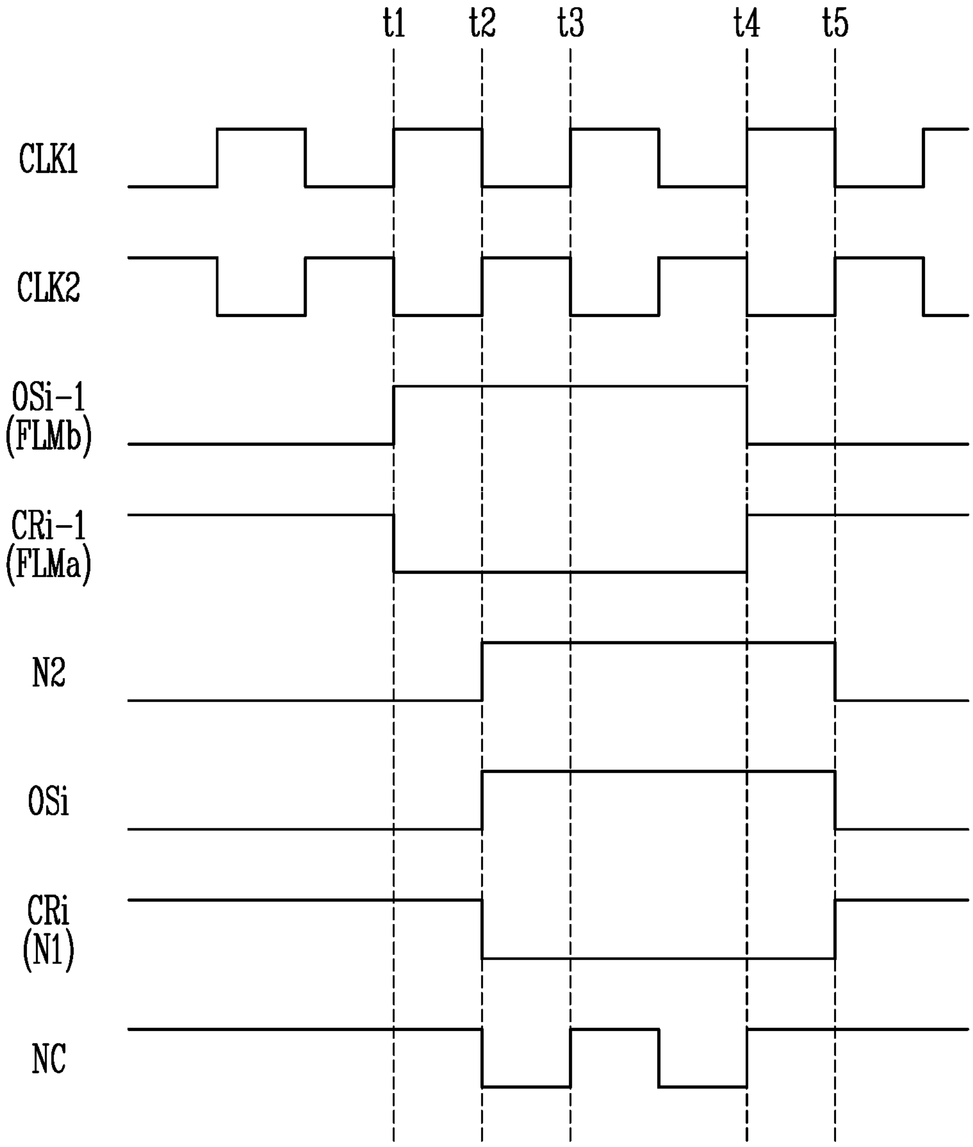
FIG. 8 is a waveform diagram illustrating aspects of a driving method of the stage circuit shown in FIG. 7 according to some embodiments.

FIG. 8 is a waveform diagram illustrating aspects of a driving method of the stage circuit shown in FIG. 7 according to some embodiments.

Referring to FIG. 8, at a first time t1, a previous enable carry signal CRi-1 may be input to the first input terminal IN1, and a previous enable output signal OSi-1 may be inputted to the second input terminal IN2. When the stage STi is a first stage, a first start signal FLMa may be input to the first input terminal IN1, and a second start signal FLMb may be input to the second input terminal IN2. The previous enable carry signal CRi-1 (or the first start signal FLMa) may be set to a low level, and the previous enable output signal OSi-1 (or the second start signal FLMb) may be set to a high level.

When the previous enable carry signal CRi-1 is input to the first input terminal IN1, the control transistor MC may be turned on. When the control transistor MC is turned on, the second electrode of the first capacitor C1 may be electrically connected to the control node NC.

When the previous enable output signal OSi-1 is supplied to the second input terminal IN2, the second transistor M2 may be turned off. When the second transistor M2 is turned off, the first power input terminal VIN1 and the control node NC may be electrically blocked from each other.

At a second time t2, the first clock signal CLK1 having the low level may be supplied to the clock input terminal CK. A voltage of the clock input terminal CK may be changed from the high level to the low level, and the voltage of the control node NC may be decreased by coupling of the first capacitor C1. When the voltage of the control node NC is decreased, the first transistor M1 may be turned on.

When the first transistor M1 is turned on, the first clock signal CLK1 having the low level may be supplied to the first node N1, and accordingly, the first node N1 may be set to a low level voltage. The second capacitor C2 may store the low level voltage. The low level voltage supplied to the first node N1 may be supplied to the second output terminal Cout. The low level voltage supplied to the second output terminal Cout may be supplied as an enable carry signal CRi to the next stage circuit.

When the low level voltage is supplied to the first node N1, the first output transistor MO1 may be turned on. When the first output transistor MO1 is turned on, the voltage of the first power source VGH may be supplied to the first output terminal Cout. The voltage (i.e., a high level voltage) of the first power source VGH, which is supplied to the first output terminal Gout, may be supplied as an enable output signal OSi to the next stage circuit, a scan line, and/or an emission control line.

When the first clock signal CLK1 having the low level is supplied to the clock input terminal CK at the second time t2, the fifth transistor M5 may be turned on. When the fifth transistor M5 is turned on, the second input terminal IN2 and the third node N3 may be electrically connected to each other, and accordingly, the third node N3 may be supplied with the previous enable output signal OSi-1. When the previous enable output signal OSi-1 is supplied to the third node N3, the third node N3 may be set to the high level voltage, and accordingly, the second node N2 may also be set to the high level voltage.

When the voltage of the third node N3 is set to the high level, the third transistor M3 may be turned off. When the third transistor M3 is turned off, the first node N1 may stably maintain the low level voltage. When the high level voltage is supplied to the second node N2, the second output transistor M02 may be turned off. When the second output transistor M02 is turned off, the first output terminal Gout may stably maintain the voltage of the first power source VGH.

At a third time t3, the first clock signal CLK1 having the high level may be supplied to the clock input terminal CK. When the voltage of the clock input terminal CK is changed from the low level to the high level, the voltage of the control node NC may be increased by the coupling of the first capacitor C1, and accordingly, the first transistor M1 may be turned off. When the first transistor M1 is turned off, the low level voltage of the first node N1 may be stably maintained by the second capacitor C2.

At a fourth time t4, a previous disable carry signal CRi-1 may be input to the first input terminal IN1, and a previous disable output signal OSi-1 may be input to the second input terminal IN2.

When the previous disable carry signal CRi-1 is input to the first input terminal IN1, the control transistor MC may be turned off. When the control transistor MC is turned off, the second electrode of the first capacitor C1 may be electrically blocked from the control node NC. The second electrode of the first capacitor C1 may be set to be in a floating state.

When the previous disable output signal OSi-1 is supplied to the second input terminal IN2, the second transistor M2 may be turned on. When the second transistor M2 is turned on, the voltage of the first power source VGH may be supplied to the control node NC. When the voltage of the first power source VGH is supplied to the control node NC, the first transistor M1 may be turned off. When the first transistor M1 is turned off, electrical connection between the first node N1 and the clock input terminal CK may be blocked.

At a fifth time t5, the first clock signal CLK1 having the low level may be supplied to the clock input terminal CK. When the first clock signal CLK1 having the low level is supplied to the clock input terminal CK, the fifth transistor M5 may be turned on.

When the fifth transistor M5 is turned on, the second input terminal IN2 and the third node N3 may be electrically connected to each other, and accordingly, the third node N3 may be supplied with a voltage (i.e., the low level voltage) of the previous disable output signal OSi-1. When the voltage of the third node N3 is set to the low level, the voltage of the second node N2 may also be set to the low level.

When the third node N3 is set to the low level voltage, the third transistor M3 may be turned on. When the third transistor M3 is turned on, the voltage of the first power source VGH may be supplied to the first node N1. The voltage of the first power source VGH, which is supplied to the first node N1, may be supplied to the second output terminal Cout. The voltage of the first power source VGH, which is supplied to the second output terminal Cout, may be supplied as a disable carry signal CRi to the next stage circuit.

When the voltage of the first power source VGH is supplied to the first node N1, the first output transistor MO1 may be turned off. When the first output transistor MO1 is turned off, electrical connection between the first power input terminal VIN1 and the first output terminal Gout may be blocked.

When the low level voltage is supplied to the second node N2, the second output transistor M02 may be turned on. When the second output transistor M02 is turned on, the voltage of the second power source VGL may be supplied to the first output terminal Gout. The voltage of the second power source VGL, which is supplied to the first output terminal Gout, may be supplied as a disable output signal OSi to the next stage, the scan line, and/or the emission control line.

Meanwhile, because the control transistor MC is set to be in a turn-off state after the fourth time t4, i.e., because the second node of the first capacitor C1 is set to be in the floating state, the voltage of the control node NC is not changed even when the voltage of the first clock signal CLK1 is changed.

In addition, because the second node of the first capacitor C1 is set to be in the floating sate, the first capacitor C1 is not charged/discharged regardless of the change in the voltage of the first clock signal CLK1, and accordingly, power consumption can be reduced.

This will be described in detail. When the control transistor MC is removed, the second node of the first capacitor C1 may be supplied with the voltage of the first power source VGH after the fourth time t4. The first capacitor C1 may be continuously charged/discharged corresponding to the change in the voltage of the first clock signal CLK1, and accordingly, the power consumption may be increased.

On the other hand, like the embodiments of the present disclosure, when the second electrode of the first capacitor C1 is set to be in the floating state, using the control transistor MC, the first capacitor C1 is not unnecessarily charged/discharged, and accordingly, the power consumption can be reduced.

Figure 9:
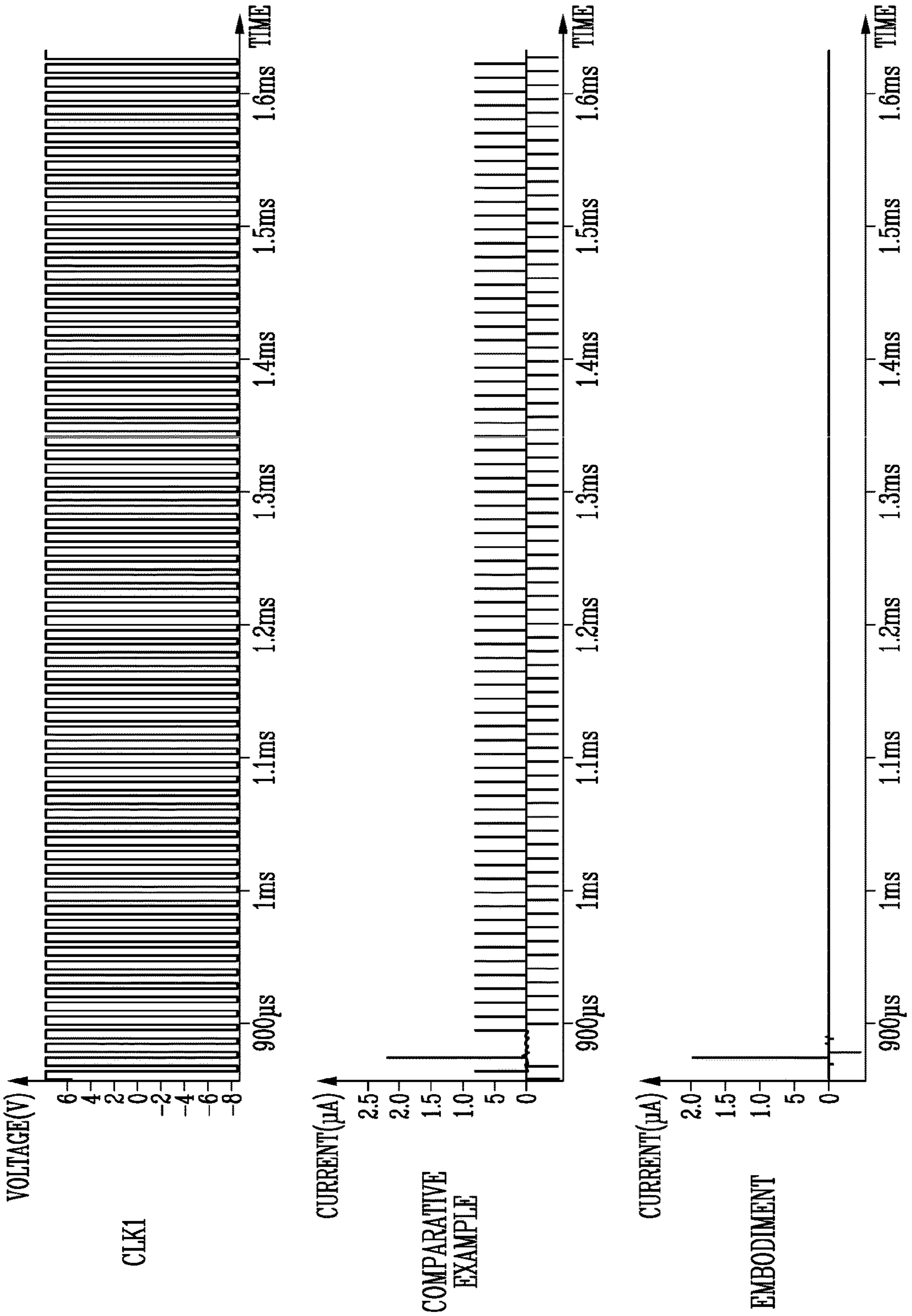
FIG. 9 illustrates charge/discharge of a first capacitor in the stage circuit shown in FIG. 7.

FIG. 9 illustrates charge/discharge of the first capacitor in the stage circuit shown in FIG. 7. In FIG. 9, the X axis represents time [ms], the Y axis of CLK1 represents voltage [V], and the Y axis of each of a comparative example and an embodiment represent current [μA]. In FIG. 9, the embodiment indicates the stage circuit shown in FIG. 7, and the comparative example indicates a case where the control transistor MC is removed in FIG. 7.

Referring to FIG. 9, in the case of the comparative example, the first capacitor is continuously charged/discharged during a driving period of the stage circuit STi, and accordingly, power consumption may be required. As compared with this, according to some embodiments of the present disclosure, the first capacitor C1 is charged/discharged in only a period in which the enable output signal OSi is supplied in the stage circuit STi, and is not charged/discharged during other periods. That is, in the case of the embodiments of the present disclosure, power consumption caused by the charge/discharge of the first capacitor C1 can be minimized or reduced. According to some embodiments of the present disclosure, as compared with the comparative example, power consumption caused by toggling of the first clock signal CLK1 can be decreased by approximately 82%.

Figure 10:
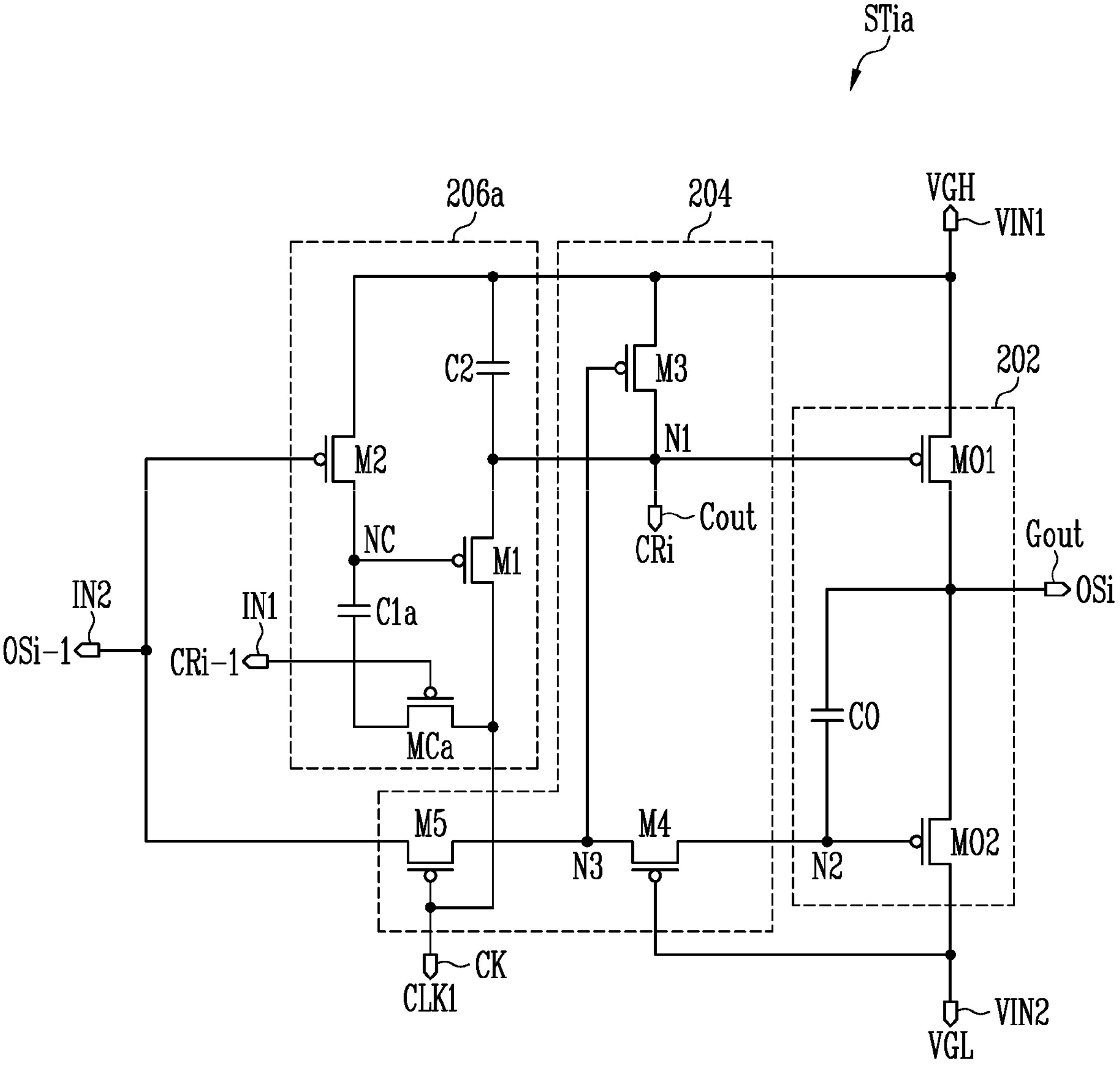
FIG. 10 is a circuit diagram illustrating a stage circuit according to some embodiments of the present disclosure.

FIG. 10 is a circuit diagram illustrating a stage circuit according to some embodiments of the present disclosure. In FIG. 10, an ith stage circuit STia will be described. In FIG. 10, components identical to those shown in FIG. 7 are designated by like reference numerals, and overlapping descriptions will be omitted.

Referring to FIG. 10, the stage circuit STia according to some embodiments of the present disclosure may include an output unit 202, a first driver 204, and a second driver 206*a*.

The second driver 206*a* may control the voltage of the first node N1, corresponding to the first power source VGH supplied from the first power input terminal VIN1, a previous carry signal CRi-1 supplied from the first input terminal IN1, a previous output signal OSi-1 supplied to the second input terminal IN2, and the first clock signal CLK1 supplied to the clock input terminal CK.

To this end, the second driver 206*a* may include a first transistor M1, a second transistor M2, a control transistor MCa, a first capacitor C1*a*, and a second capacitor C2.

The control transistor MCa and the first capacitor C1*a* may be connected in series between the control node NC and the clock input terminal CK.

A second electrode of the first capacitor C1*a* may be connected to the control node NC. The control transistor MCa may be connected between a first electrode of the first capacitor C1*a* and the clock input terminal CK. In addition, a gate electrode of the control transistor MCa may be connected to the first input terminal IN1. The control transistor MCa may be turned on when a previous enable carry signal CRi-1 is supplied to the first input terminal, and be turned off in other cases.

When the control transistor MCa is turned off, the first electrode of the first capacitor C1*a* may be set to be in the floating state. That is, the control transistor MCa is turned off, the clock input terminal CK and the first capacitor C1*a* may be electrically blocked from each other. Then, the first capacitor C1*a* is not charged/discharged by the first clock signal CLK1, and accordingly, power consumption can be reduced.

In the stage circuit and the display device including the same according to some embodiments of the present disclosure, the charge/discharge of a capacitor can be minimized or reduced, thereby relatively reducing power consumption.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims and their equivalents.

What is claimed is:

1. A stage circuit for a display gate driver comprising:

an output unit connected to a first power input terminal to which a first power source is input and a second power input terminal to which a second power source is input, the output unit configured to output an enable output signal to a first output terminal, corresponding to a voltage of a second node;

a first driver connected to the first power input terminal, the second power input terminal, a clock input terminal configured to receive a clock signal, and a second input terminal configured to receive a previous enable output signal, the first driver being configured to control the voltages of a first node and the second node wherein the first driver outputs an enable carry signal at a first node to a second output terminal; and a second driver connected to a first input terminal configured to receive a previous enable carry signal, the second input terminal, the first power input terminal, and the clock input terminal, the second driver being configured to control a voltage of the first node, wherein the second driver includes:

a first transistor connected between the first node and the clock input terminal, the first transistor including a gate electrode connected to a control node; and a control transistor and a first capacitor, connected in series between the control node and the clock input terminal, the control transistor including a gate electrode connected to the first input terminal.

2. The stage circuit of claim 1, wherein the enable output signal is set to a high level, and the enable carry signal is set to a low level.

3. The stage circuit of claim 2, wherein the control transistor is connected between the control node and the first capacitor.

4. The stage circuit of claim 3, wherein the control transistor is configured to be set to be in a turn-off state based on a disable carry signal as a high level voltage being input to the first input terminal.

5. The stage circuit of claim 2, wherein the control transistor is connected between the first capacitor and the clock input terminal.

6. The stage circuit of claim 5, wherein the control transistor is configured to be set to be in a turn-off state based on a disable carry signal as a high level voltage being input to the first input terminal.

7. The stage circuit of claim 1, wherein the second driver further includes:

a second capacitor connected between the first power input terminal and the first node; and a second transistor connected between the first power input terminal and the control node, the second transistor including a gate electrode connected to the second input terminal.

8. The stage circuit of claim 1, wherein the output unit includes:

a first output transistor connected between the first power input terminal and the first output terminal, the first output transistor including a gate electrode connected to the first node;

a second output transistor connected between the first output terminal and the second power input terminal, the second output transistor including a gate electrode connected to the second node; and a capacitor connected between the first output terminal and the second node, and wherein the second output terminal is connected to the first node.

9. The stage circuit of claim 1, wherein the first driver includes:

a third transistor connected between the first power input terminal and the first node, the third transistor including a gate electrode connected to a third node;

a fourth transistor connected between the third node and the second node, the fourth transistor including a gate electrode connected to the second power input terminal; and a fifth transistor connected between the second input terminal and the third node, the fifth transistor including a gate electrode connected to the clock input terminal.

10. The stage circuit of claim 1, wherein the first power source is set to a high level voltage, and the second power source is set to a low level voltage.

11. A stage circuit for a display gate driver, comprising:

an output unit configured to supply an output signal to a first output terminal, corresponding to a voltage of a second node;

a first driver configured to control the voltages of a first node and the second node, corresponding to a clock signal and a previous output signal and configured to supply a carry signal at the first node to a second output terminal; and a second driver configured to control a voltage of the first node, based on the previous output signal, the clock signal, and a previous carry signal, wherein the second driver includes:

a first transistor connected between the first node and a clock input terminal configured to receive the clock signal, the first transistor including a gate electrode connected to a control node; and a first capacitor and a control transistor, connected in series between the control node and the clock input terminal, and wherein the control transistor is configured to be turned on based on the previous carry signal being input, to connect a first electrode of the first capacitor to the clock input terminal and to connect a second electrode of the first capacitor to the control node, and is configured to be turned off based on the previous carry signal not being input, to set the first capacitor to be in a floating state.

12. The stage circuit of claim 11, wherein the control transistor is connected between the first capacitor and the control node.

13. The stage circuit of claim 11, wherein the control transistor is connected between the first capacitor and the clock input terminal.

14. A display device comprising:

a gate driver including a plurality of stage circuits configured to supply a scan signal having a high level or an emission control signal having the high level, wherein at least one of the stage circuits includes:

an output unit connected to a first power input terminal to which a first power source is input and a second power input terminal to which a second power source is input, the output unit configured to output an enable output signal to a first output terminal, corresponding to a voltage of a second node;

a first driver connected to the first power input terminal, the second power input terminal, a clock input terminal configured to receive a clock signal, and a second input terminal configured to receive a previous enable output signal, the first driver configured to control the voltages of a first node and the second node wherein the first driver outputs an enable carry signal at the first node to a second output terminal; and a second driver connected to a first input terminal configured to receive a previous enable carry signal, the second input terminal, the first power input terminal, and the clock input terminal, the second driver being configured to control a voltage of the first node, wherein the second driver includes:

a first transistor connected between the first node and the clock input terminal, the first transistor including a gate electrode connected to a control node; and a control transistor and a first capacitor, connected in series between the control node and the clock input terminal, the control transistor including a gate electrode connected to the first input terminal.

15. The display device of claim 14, wherein the enable output signal is set to the high level, and the enable carry signal is set to a low level, and wherein the enable output signal is the scan signal or the emission control signal.

16. The display device of claim 15, wherein the control transistor is connected between the control node and the first capacitor, and is configured to be in a turn-off state based on a disable carry signal as a high level voltage being input to the first input terminal.

17. The display device of claim 15, wherein the control transistor is connected between the first capacitor and the clock input terminal, and is configured to be in a turn-off state based on a disable carry signal as a high level voltage being input to the first input terminal.

18. The display device of claim 14, wherein the second driver further includes:

a second capacitor connected between the first power input terminal and the first node; and a second transistor connected between the first power input terminal and the control node, the second transistor including a gate electrode connected to the second input terminal.

19. The display device of claim 14, wherein the output unit includes:

a first output transistor connected between the first power input terminal and the first output terminal, the first output transistor including a gate electrode connected to the first node;

a second output transistor connected between the first output terminal and the second power input terminal, the second output transistor including a gate electrode connected to the second node; and a capacitor connected between the first output terminal and the second node, and wherein the second output terminal is connected to the first node.

20. The display device of claim 14, wherein the first driver includes:

a third transistor connected between the first power input terminal and the first node, the third transistor including a gate electrode connected to a third node;

a fourth transistor connected between the third node and the second node, the fourth transistor including a gate electrode connected to the second power input terminal; and a fifth transistor connected between the second input terminal and the third node, the fifth transistor including a gate electrode connected to the clock input terminal.

* * * * *